United States Patent
Keller et al.

(10) Patent No.: US 10,696,255 B2
(45) Date of Patent: Jun. 30, 2020

(54) IMPACT ABSORBING ELEMENT

(71) Applicant: MAGNA INTERNATIONAL INC., Aurora (CA)

(72) Inventors: Roland Keller, Dorfprozelten (DE); Satish Shivpanor, Aschaffenburg (DE)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 14/768,502

(22) PCT Filed: Feb. 4, 2014

(86) PCT No.: PCT/IB2014/000381
§ 371 (c)(1),
(2) Date: Aug. 18, 2015

(87) PCT Pub. No.: WO2014/128560
PCT Pub. Date: Aug. 28, 2014

(65) Prior Publication Data
US 2016/0001726 A1    Jan. 7, 2016

(30) Foreign Application Priority Data

Feb. 19, 2013  (DE) .................. 10 2013 202 607

(51) Int. Cl.
*B60R 19/34* (2006.01)
*F16F 7/12* (2006.01)
*B60R 19/26* (2006.01)

(52) U.S. Cl.
CPC ............. *B60R 19/34* (2013.01); *F16F 7/12* (2013.01); *F16F 7/121* (2013.01); *B60R 2019/264* (2013.01)

(58) Field of Classification Search
CPC .. F16F 7/12; F16F 7/121; B60R 19/34; B60R 2019/264
USPC ................................... 303/371, 377
See application file for complete search history.

(56) References Cited

U.S. PATENT DOCUMENTS

| | | | |
|---|---|---|---|
| 6,086,098 A * | 7/2000 | Reiter | B60R 21/045 188/377 |
| 6,969,548 B1 | 11/2005 | Goldfine | |
| 7,694,787 B2 | 4/2010 | Kano et al. | |
| 8,287,013 B2 | 10/2012 | Kano et al. | |
| 8,297,668 B2 | 10/2012 | Nakanishi et al. | |
| 2002/0079711 A1* | 6/2002 | Kajiwara | B60R 19/18 293/133 |
| 2003/0057692 A1* | 3/2003 | Horsch | B60R 21/045 280/752 |

(Continued)

FOREIGN PATENT DOCUMENTS

| EP | 1640147 A1 | 3/2006 |
|---|---|---|
| JP | 2008018792 A | 1/2008 |

(Continued)

*Primary Examiner* — Melody M Burch
(74) *Attorney, Agent, or Firm* — Dickinson Wright PLLC

(57) ABSTRACT

An impact absorbing element comprising a tubular body for absorbing the impact energy in a vehicle is proposed, the impact absorbing element having a double honeycomb-shaped cross section and being configured as a 10-face polygonal line, and honeycomb points being configured which are situated at a spacing (b2) from one another of approximately half the overall height (b1) of the impact absorbing element and define a width.

8 Claims, 2 Drawing Sheets

(56) References Cited

U.S. PATENT DOCUMENTS

| | | | |
|---|---|---|---|
| 2007/0056819 A1 | 3/2007 | Kano et al. | |
| 2008/0012386 A1* | 1/2008 | Kano | B60R 19/34 |
| | | | 296/187.03 |
| 2009/0026799 A1* | 1/2009 | Gavrilov | B62D 21/15 |
| | | | 296/187.05 |
| 2010/0126813 A1* | 5/2010 | Hayashi | B60R 19/34 |
| | | | 188/377 |
| 2011/0187135 A1 | 8/2011 | Kano et al. | |
| 2014/0034435 A1* | 2/2014 | Kondo | B60R 19/34 |
| | | | 188/377 |

FOREIGN PATENT DOCUMENTS

| | | |
|---|---|---|
| JP | 2008296716 A | 12/2008 |
| JP | 2010120026 A | 6/2010 |
| JP | 2011179579 A | 9/2011 |
| WO | 2012040826 A1 | 4/2012 |
| WO | WO-2012133868 A1 * 10/2012 ............. B60R 19/34 |

\* cited by examiner

IMPACT ABSORBING ELEMENT

CROSS-REFERENCE TO RELATED APPLICATIONS

This U.S. National Stage patent application claims the benefit of PCT International Patent Application Serial No. PCT/IB2014/000381 filed Feb. 4, 2014 entitled "Impact Absorbing Element," which claims the benefit of DE 10 2013 202 607.2 filed Feb. 19, 2013, entitled "Impact Absorbing Element," the entire disclosures of the applications being considered part of the disclosure of this application and hereby incorporated by reference.

The invention proceeds from an impact absorbing element comprising a tubular body for absorbing the impact energy in a vehicle, the impact absorbing element having a double honeycomb-shaped cross section.

PRIOR ART

Bumpers are arranged transversely on the front and rear of a motor vehicle between the plastic fairing which completes the vehicle body and the frame of the motor vehicle. In order to avoid damage of the vehicle structure in frontal or rear impacts at low speeds, deformation elements, impact absorbing elements, are integrated. Impact absorbing elements are thin-walled elements which are as a rule rectangular and are made from steel, aluminum or plastic. They can be produced by joining from pressed sheet metal shells or in one piece, for example as an extruded aluminum profile.

Arranged between the vehicle longitudinal carrier and the bumper crossmember, the impact absorbing elements absorb the kinetic energy which results from an impact, by said kinetic energy being converted into deformation energy. This is intended to avoid a situation where the longitudinal carrier is damaged permanently if a critical load level is exceeded. Here, the impact absorbing elements are typically adapted to the vehicle structure and its needs. Furthermore, the impact absorbing elements have to comply with the different requirements of the legal regulations, and the different vehicle weights and the hardness of the materials. The impact absorbing elements are therefore produced according to vehicle type. It is desirable here that impact absorbing elements are capable of absorbing as much energy as possible, but at the same time do not represent too much additional weight for the vehicle.

Impact absorbing elements are known from the prior art. WO2012040826 A1 describes a scalable impact absorbing element, the cross section of which consists of a 10-side polygon. Here, the impact absorbing element which is described is constructed symmetrically about a center axis. Here, mainly star-shaped embodiments are described. Said 10-side polygon which is guided along a circular line makes a certain improvement possible in comparison with the previously customary impact absorbing elements with a rectangular cross section.

It is the object of the invention to propose impact absorbing elements, the functionality of which is improved in comparison with the impact absorbing elements which are known in the prior art, with the same weight.

This object is achieved by way of the features that the impact absorbing element consists of a tubular body for receiving the impact energy in a vehicle, the impact absorbing element having a double honeycomb-shaped cross section and being configured as a 10-faced polygon. Honeycomb points are advantageously configured which are situated at a spacing from one another of approximately half of the overall height of the impact absorbing element and define a width.

It has been shown that the configuration of honeycomb points is one particularly advantageous embodiment of the 10-side polygon. As a result of the special shape, the energy of an impact is absorbed in a particularly suitable way, and the impact absorbing element exhibits a high energy absorbing capacity.

One particularly advantageous embodiment is represented by a refinement of the 10-side polygon, the width of the impact absorbing element being equally large in both honeycombs. By virtue of the fact that the honeycomb size is selected to be identical for the two honeycombs, symmetrical introduction of the absorption energy can be ensured. A maximum quantity of energy is absorbed in this way between the bumper and vehicle frame in a normal vehicle.

The overall height is advantageously greater than the width.

Furthermore, it is advantageous that end faces have approximately 0.33 times the width.

It is also advantageous that a constriction between the two honeycombs has a clearance of approximately one third the width.

In order to achieve an optimum adaptation to the impact requirements which are stipulated in the individual case, it is imperative that the adjustability for the heights and widths lies at at least ±50% of the starting value.

For reasons of manufacturing technology, it is the case that the radii of the constriction and of the honeycomb points correspond at least to the thickness of the shell material of the impact absorbing element.

In a further particularly advantageous embodiment, the constriction of the width is effected down to virtually zero.

It is particularly important for all embodiments which are mentioned that no provisions or notches are to be provided, in order that the impact absorbing element can buckle and fold at these points. As a result of its double honeycomb structure, it is possible that, without additional folding aids, the impact absorbing element exhibits a deformation behavior which is beyond that which is usual in the prior art.

DESCRIPTION OF THE INVENTION

In the following text, the invention will be described by way of example with reference to the appended drawing, in which.

Figure 1:
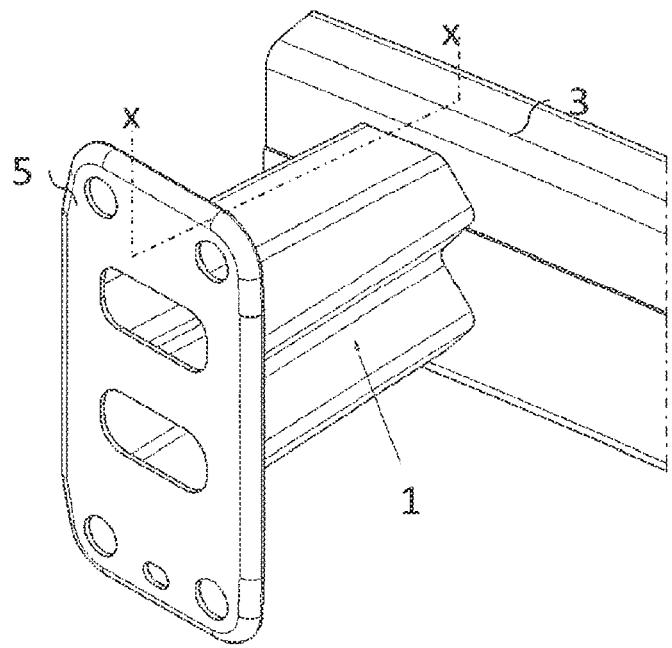
FIG. 1 shows a diagrammatic illustration of the exemplary embodiment.

FIG. 1 shows the installation location of the impact absorbing element. The impact absorbing element 1 is situated between a bumper crossmember 3 and a connection plate 5. The connection plate 5 serves as a flange to fasten the absorbing element to a vehicle longitudinal carrier which is not shown.

Figure 2:
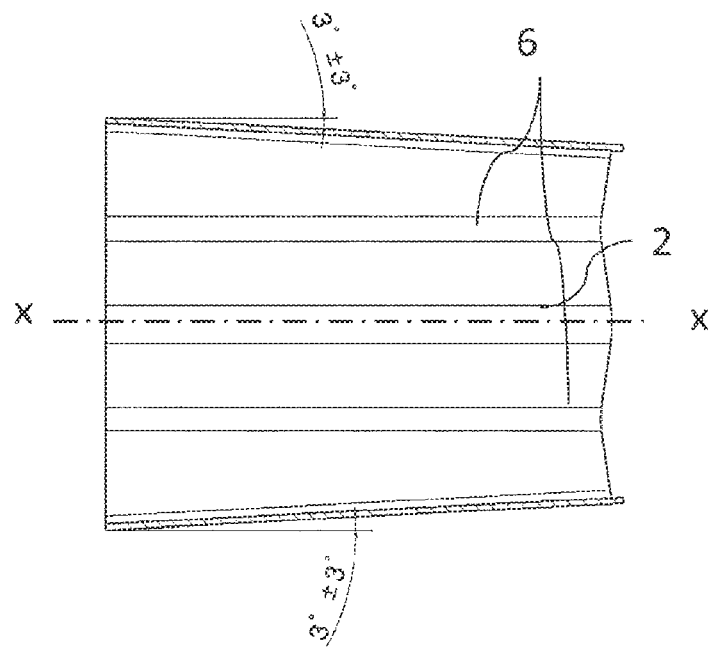
FIG. 2 shows a side view of the impact absorbing element.

FIG. 2 shows the impact absorbing element in a side view along the axis X-X. Here, in this exemplary embodiment, the impact absorbing element 1 has a conically tapering longitudinal profile. In this exemplary embodiment, an angle of 3° is specified by way of example, with which the component tapers conically in the direction of the bumper. Here, the tapering of the impact absorbing element is effected by way of a reduction in the outer part region of the element.

This is the uppermost and the lowermost part region of the component in the drawing. The regions in the center of the impact absorbing element which are indicated in outline form run in parallel, in contrast.

For an optimization of the impact absorbing element, it would also be possible for further part regions of the component to be tapered conically. This means that the entire overall heights and overall widths and the configuration of the component can change over the longitudinal extent. A profile, in which only one plane tapers conically in the direction of the bumper along the axis X-X is also conceivable as an embodiment. However, the conical profile is not required in order to carry out the invention.

The parameters which are discussed in the following text are exemplary parameters, as are configured at a cross-sectional point of the component. In the simplest case, the component retains the same cross section over its entire overall length. However, embodiments are also conceivable, in which the ratios of the individual lengths and widths are changed over the overall lengths.

Figure 3:
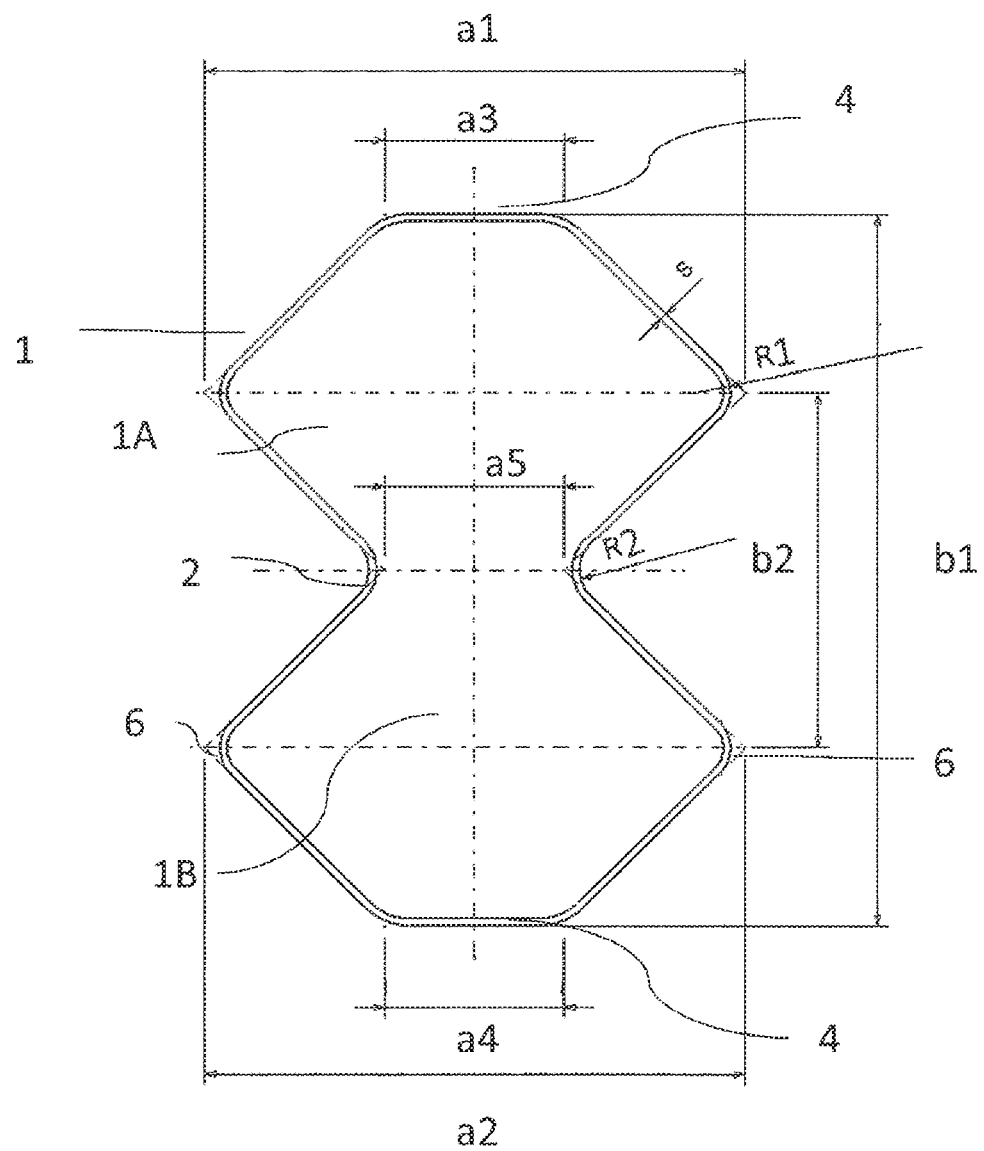
FIG. 3 shows a cross section of the impact absorbing element.

One embodiment which is relevant to the invention is shown in FIG. 3. FIG. 3 shows the cross section perpendicularly with respect to the longitudinal profile of the impact absorbing element. It can be seen that this is a polygon with 10 faces. The contour of the 10-faced polygon is constructed in the form of two honeycombs 1A and 1B which are in contact with one another at a constriction 2. The impact absorbing element has a width a1 and an overall height b1. Here, in order to achieve optimum energy absorption, the overall height b1 is always greater than a1.

In the selected embodiment, the two honeycombs 1A and 1B are of identical size. The widths a1 and a2 are therefore identical apart from tolerances. In this example, the end faces 4 which are arranged at the top and bottom in the drawing, denoted by a3 and a4, are also identical. Here, the width of the face a3 in relation to the overall width is approximately one third 0.33 of the width a1, a tolerance being provided of 0.2 times the width a1. Since the exemplary embodiment is of symmetrical construction, the rule can also be applied to the width a4. The clearance a5 of the constriction 2 in this exemplary embodiment likewise lies at 0.33 times the width a1 of the entire impact absorbing element. Here, the tolerance for the clearance a5 is selected to be ±0.1 times the overall width a1.

The honeycomb points 6 lie vertically at the spacing b2 from one another. The spacing b2 is defined over the overall height of the impact absorbing element and, in a first embodiment, is 0.5 times the overall height b1 with a tolerance of 0.2 times the overall height b1. The position of the spacing b2 relative to the overall height b1 is selected to be symmetrical in this exemplary embodiment.

The exemplary embodiment which is described shows an optimum impact absorbing element which can be adapted to the requirements of the respective vehicle by way of the variation of the parameters a1 to a5 and b1 and b2. The thickness of the material of the impact absorbing element is specified by s. The radii at the honeycomb points and at the constriction are likewise adapted to the requirements of the respective vehicle. Here, if curved aluminum profiles are assumed, the radii are restricted to a radius which corresponds to the thickness s, but can be produced with radii up to 10 times the thickness s or even greater radii.

If relatively great radii are used, plateau-like structures which, however, are not of planar configuration are produced at the honeycomb points 6.

In further embodiments, the two honeycombs 1A and 1B are of different dimensions.

Furthermore, it is possible to dramatically increase the magnitude of the constriction until, as it were, the design is two individual elements which are connected to one another.

As is known in the prior art, individual aluminum parts are welded to one another in one piece or multiple pieces in a suitable way, in order to produce the impact absorbing element.

The impact absorbing element according to the invention can also be produced from extruded aluminum sections without a joining process. By way of this production method, the honeycomb points are no longer subject to any limitation with regard to the radii and can be produced so as to taper to a point.

LIST OF DESIGNATIONS

1 Impact absorbing element
2 Constriction
3 Bumper
4 End face
5 Connection plate
6 Honeycomb point
a1-a5 Widths
b1 Height
b2 Spacing, honeycomb points

The invention claimed is:

1. An impact absorbing element for a bumper comprising:
a tubular body extending along an axis from a connection element to the bumper to define an overall length;
said tubular body having a cross-sectional shape taken along a plane disposed perpendicular to the axis and comprising a honeycomb shaped first section (1A) joined to a honeycomb shaped second section (1B) at a constriction (2) being open along a width (a5);
said cross-sectional shape forming a concave decagon, said concave decagon having an overall height (b1) in a longitudinal direction;
each of said first section (1A) and said second section (1B) having a pair of honeycomb points (6);
said honeycombed shaped first section (1A) defining a top face (4) of the impact absorbing element and said honeycombed shaped second section (1B) defining a bottom face (4) of the impact absorbing element, with said top face (4) having a width (a3) and said bottom face (4) having a width (a4), and with said honeycomb points (6) of said first section (1A) located opposite each other and defining a width (a1) between them and said honeycomb points (6) of said second section (1B) located opposite each other and defining a width (a2) between them being approximately equal to said width (a1);
a distance (b2) between a honeycomb point (6) on said first section (1A) and a honeycomb point (6) on said second section (1B) with each of said honeycomb points (6) located on the same side of their respective section (1A, 1B);
wherein said distance (b2) between said honeycomb point (6) on said first section (1A) and said honeycomb point (6) on said second section (1B) is equal to approximately half of said overall height (b1);
said cross-sectional shape of said tubular body tapering conically from the connection element to the bumper over at least a portion of the overall length; and
wherein said width (a5) of said constriction (2) and said width (a3) of said top face (4) and said width (a4) of said bottom face (4) are all approximately equal to one another and to about one third of said width (a1)

between said honeycomb points (6) of said first section (1A) and one third of said width (a2) between said honeycomb points (6) of said second section (1B) with a tolerance of plus or minus 0.2 times said widths (a1, a2) between said honeycomb points (6) of said first and second sections (1A, 1B).

2. An impact absorbing element as recited in claim 1, wherein said overall height (b1) in a longitudinal direction of said concave decagon is greater than said width (a1) between said honeycomb points (6) on said first section (1A) and greater than said width (a2) between said honeycomb points (6) on said second section (1B).

3. An impact absorbing element as recited in claim 1, wherein said cross-sectional shape of said tubular body tapers conically from the connection element to the bumper over the entire overall length.

4. An impact absorbing element as recited in claim 1, further comprising said tubular body formed from a shell material having a thickness (s), said constriction (2) having radii that are from 1 to 10 times said thickness (s) of said shell material and said honeycomb points (6) have radii that are from 1 to 10 times said thickness (s) of said shell material.

5. An impact absorbing element as recited in claim 1, wherein said tubular body is formed from an aluminum material.

6. An impact absorbing element as recited in claim 5, wherein said tubular body is formed from an extruded aluminum material.

7. An impact absorbing element as recited in claim 1, wherein said cross-sectional shape of said tubular body tapers conically at an angle of 3 degrees defined relative to the axis.

8. An impact absorbing element as recited in claim 1, wherein each of said honeycomb points have a substantially constant thickness (s).

\* \* \* \* \*